May 14, 1935. H. R. SCHUTZ 2,001,436
MACHINE FOR FLARING GLASS ARTICLES
Filed March 25, 1933 10 Sheets-Sheet 1

Inventor.
Harold R. Schutz
By Barnett Truman
Attorneys.

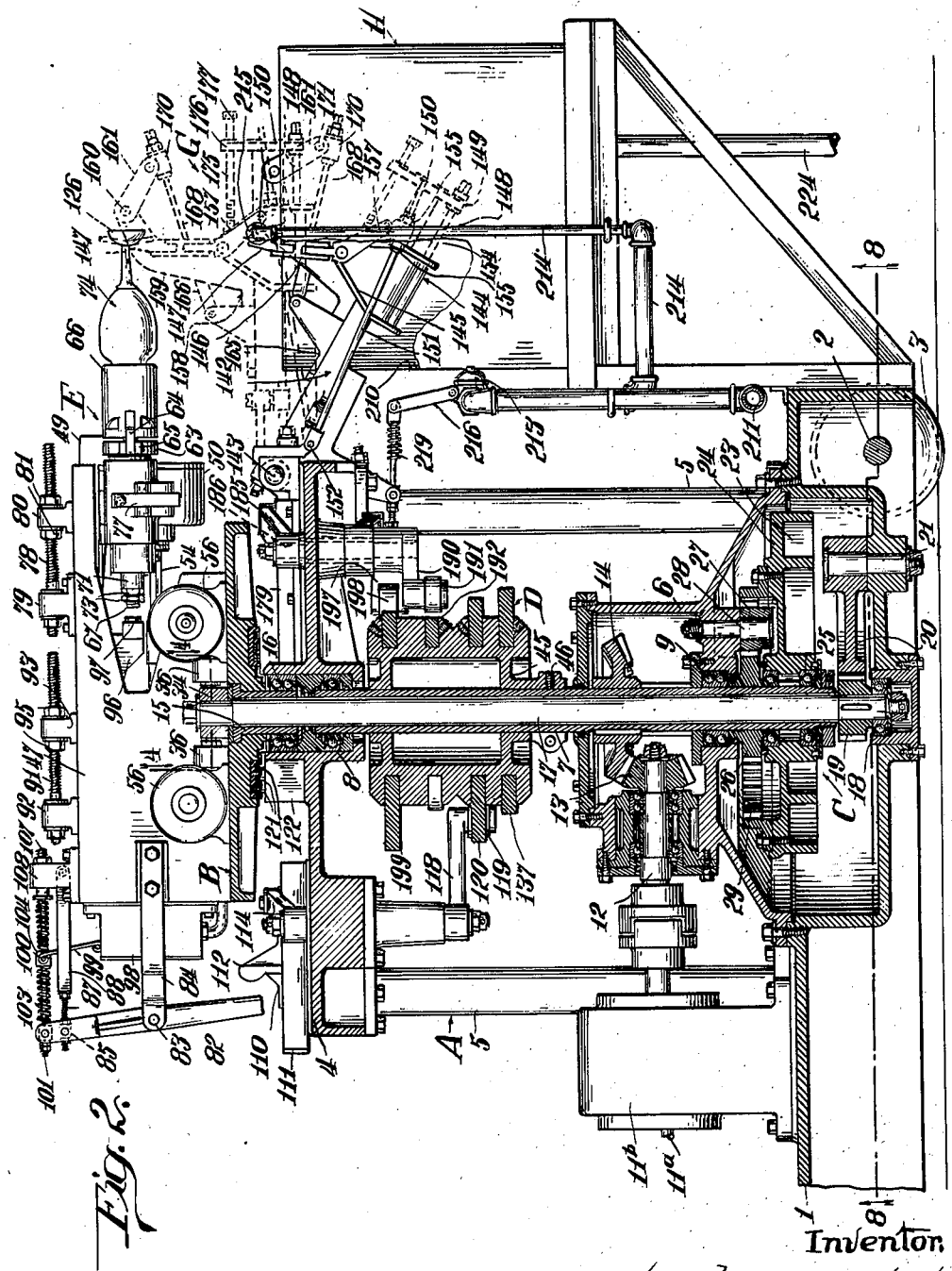

May 14, 1935.  H. R. SCHUTZ  2,001,436
MACHINE FOR FLARING GLASS ARTICLES
Filed March 25, 1933   10 Sheets-Sheet 3
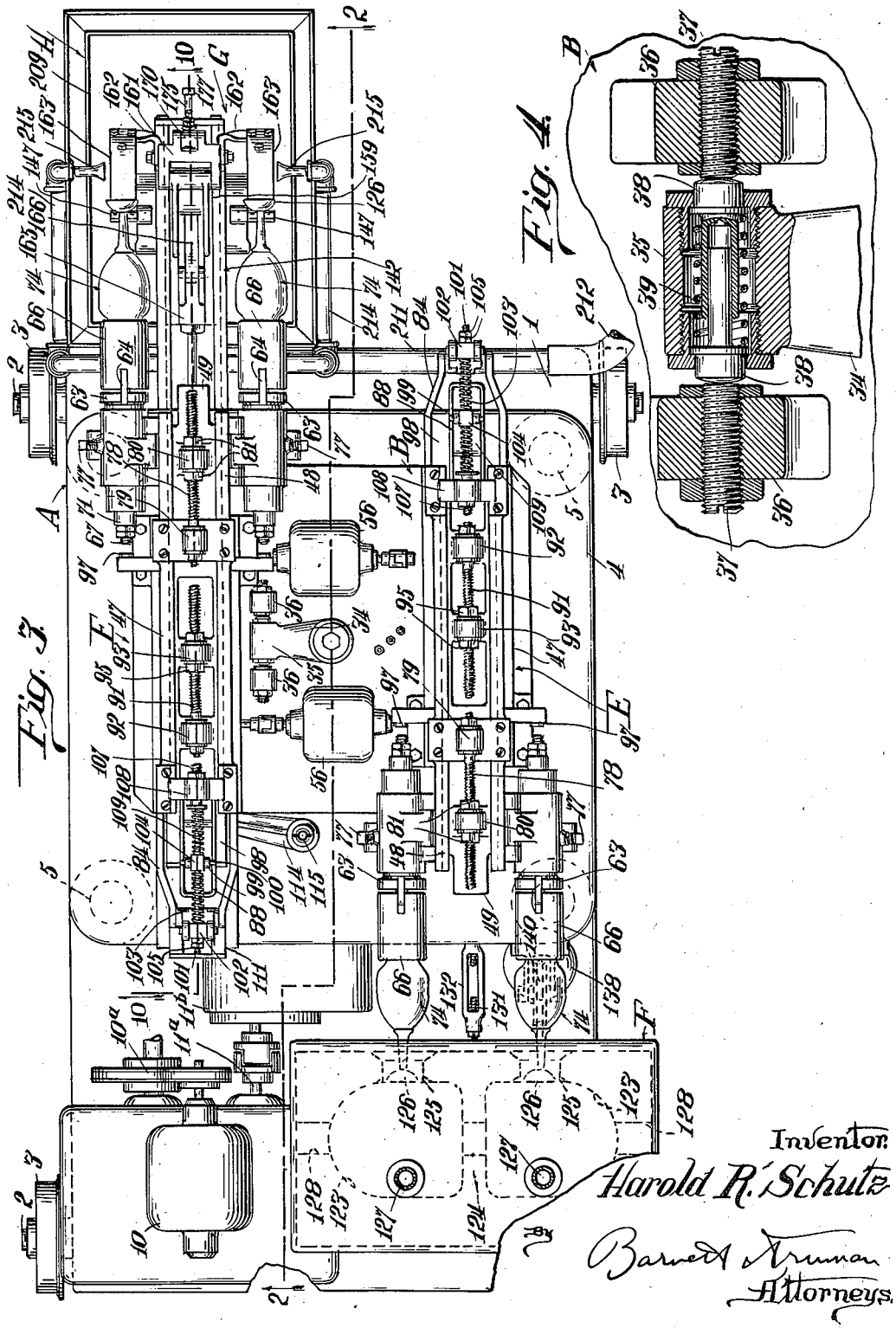
Inventor
Harold R. Schutz
By
Barwell Truman
Attorneys.

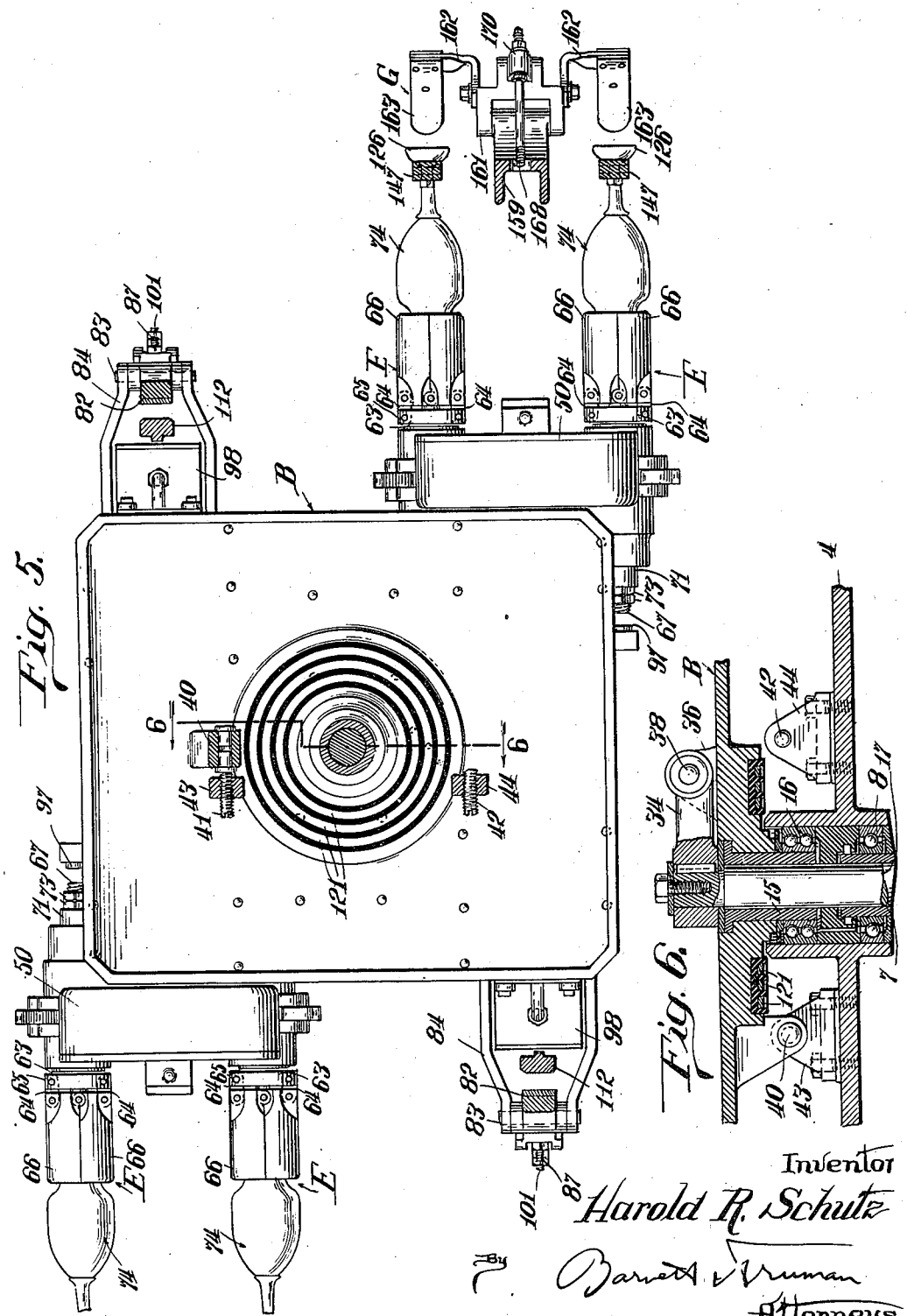

May 14, 1935. H. R. SCHUTZ 2,001,436
MACHINE FOR FLARING GLASS ARTICLES
Filed March 25, 1933 10 Sheets-Sheet 5
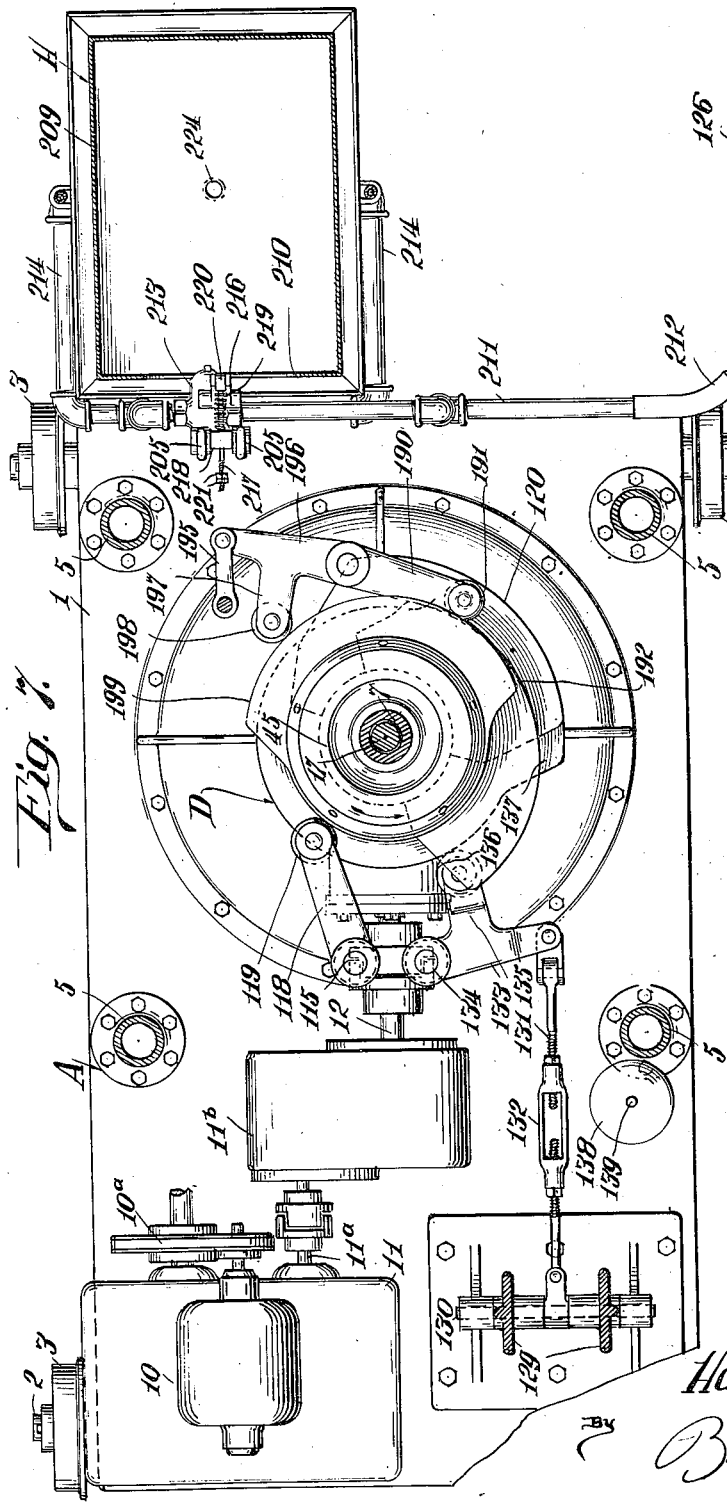

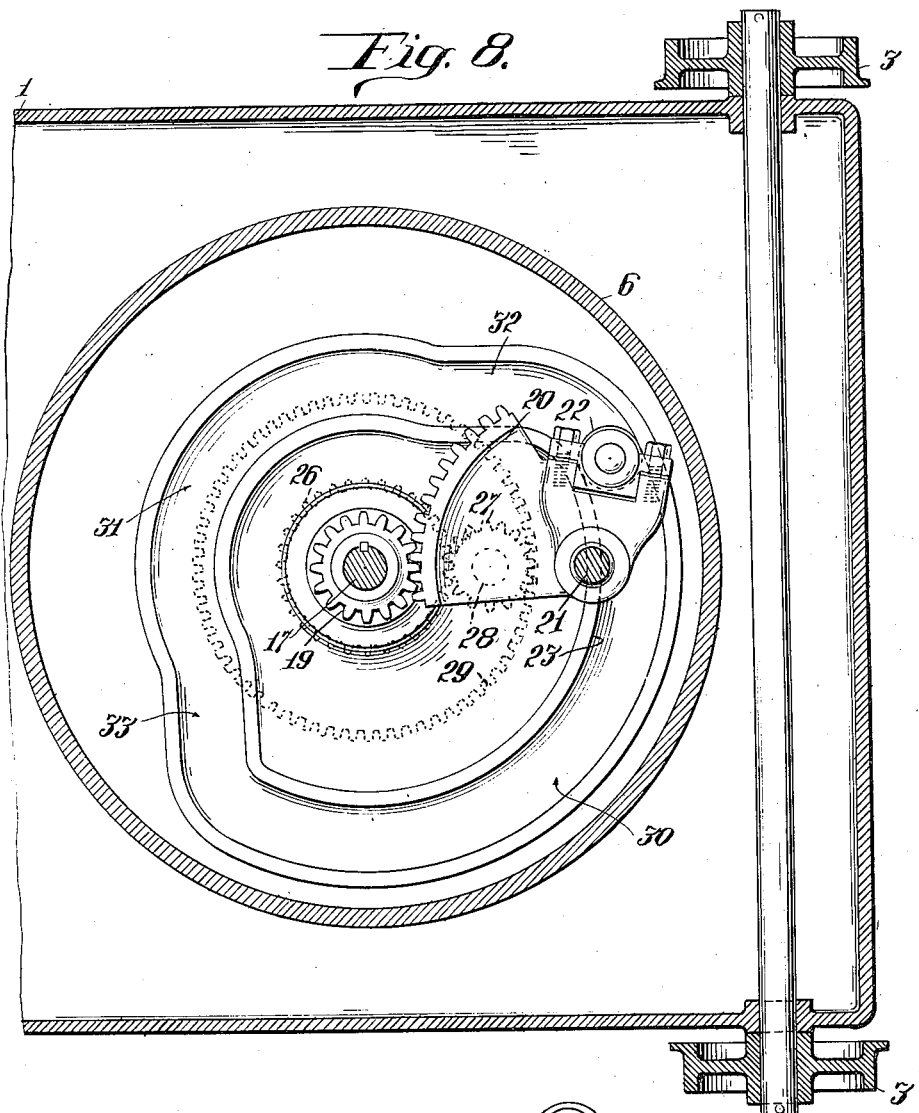
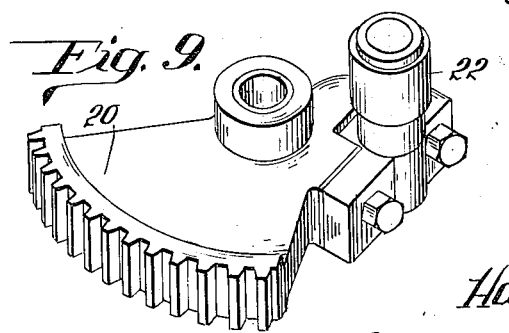

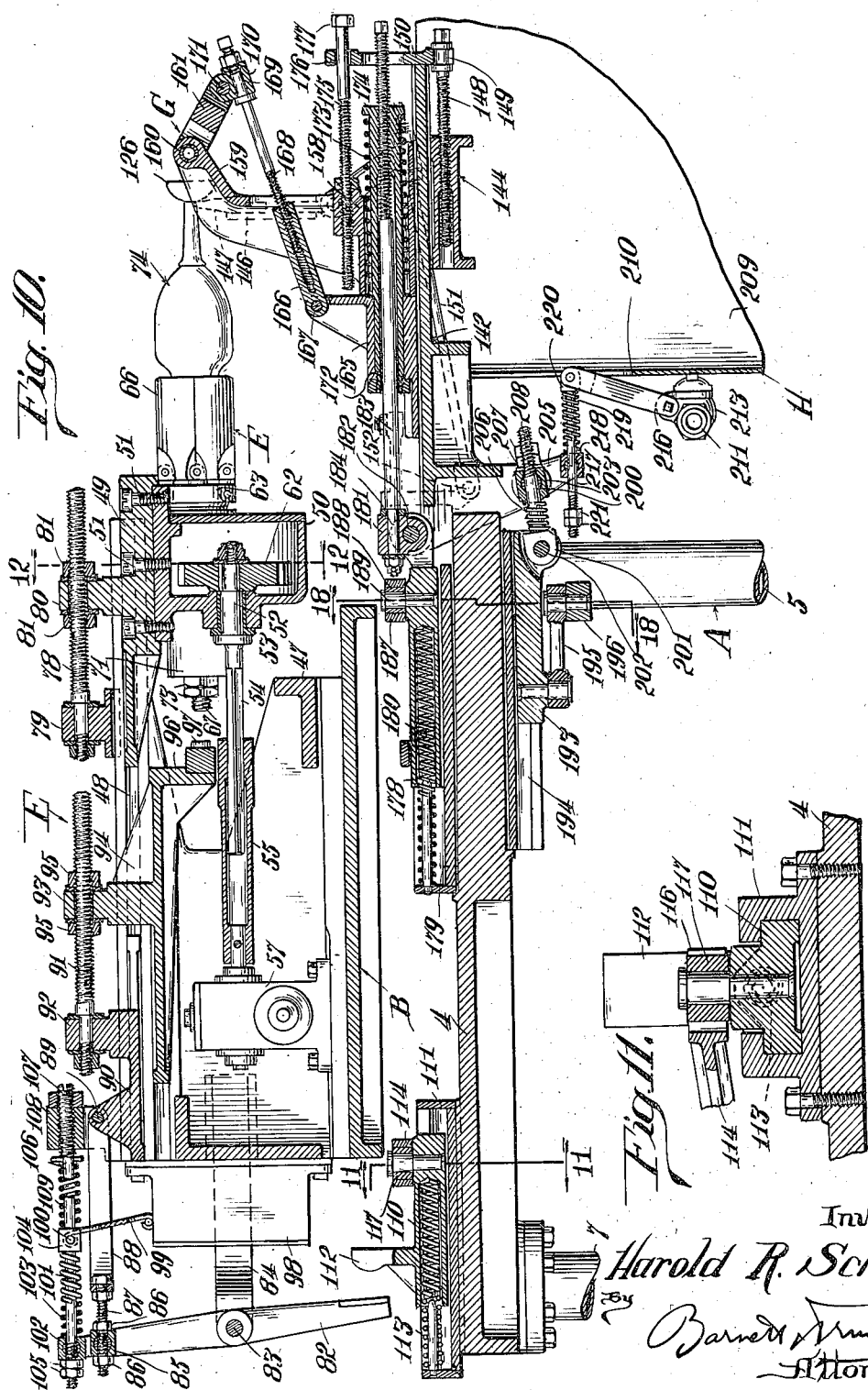

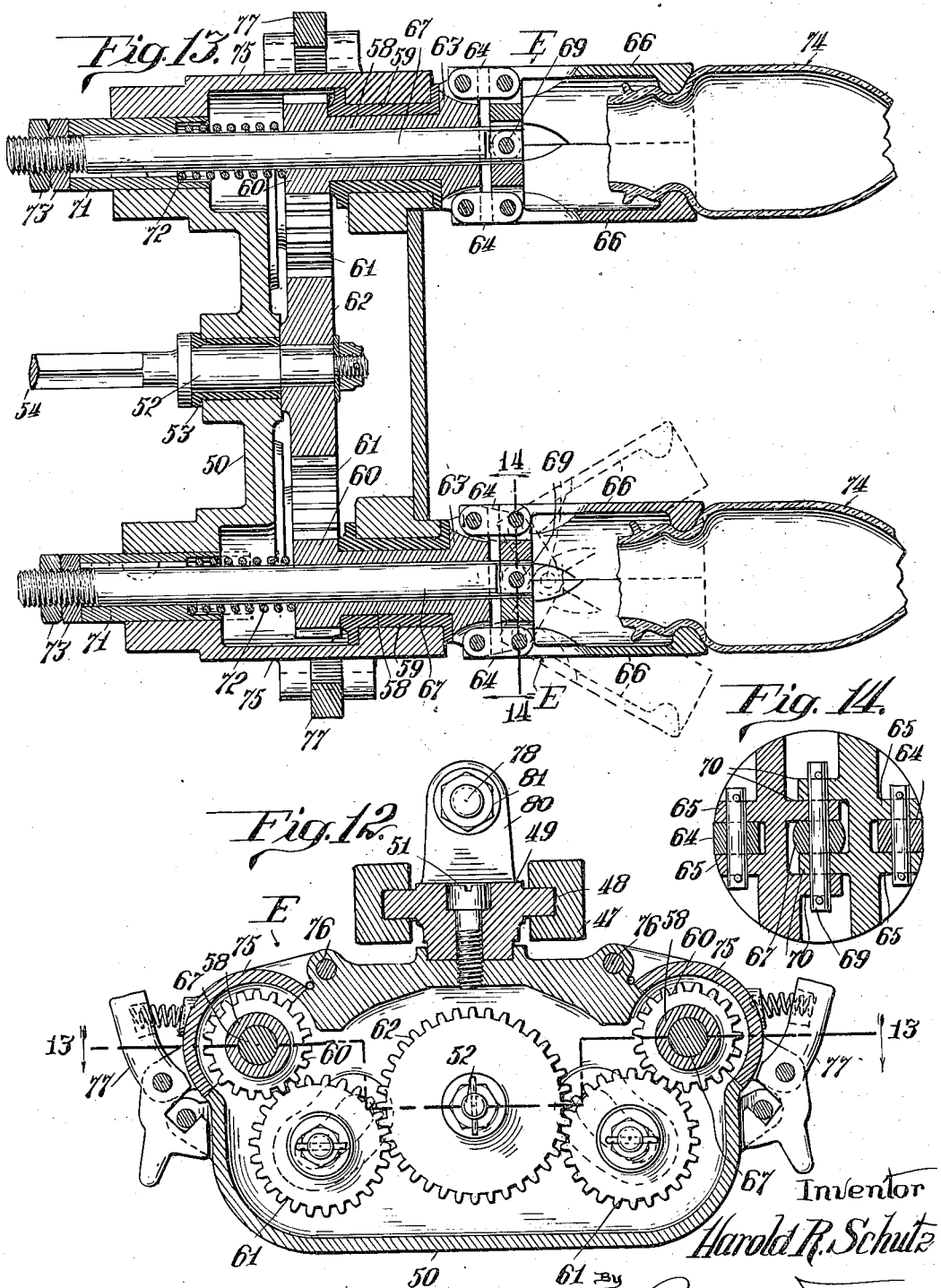

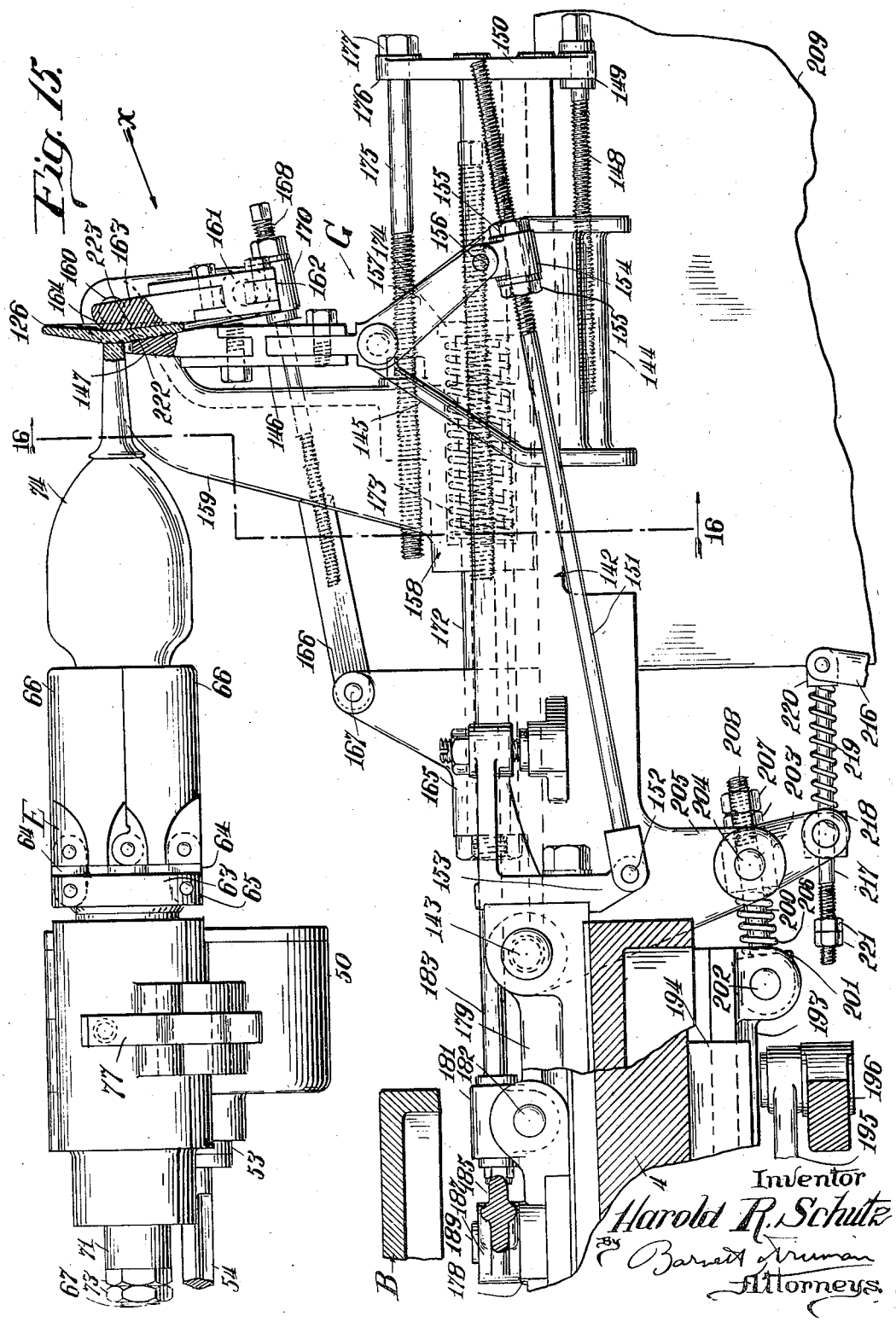

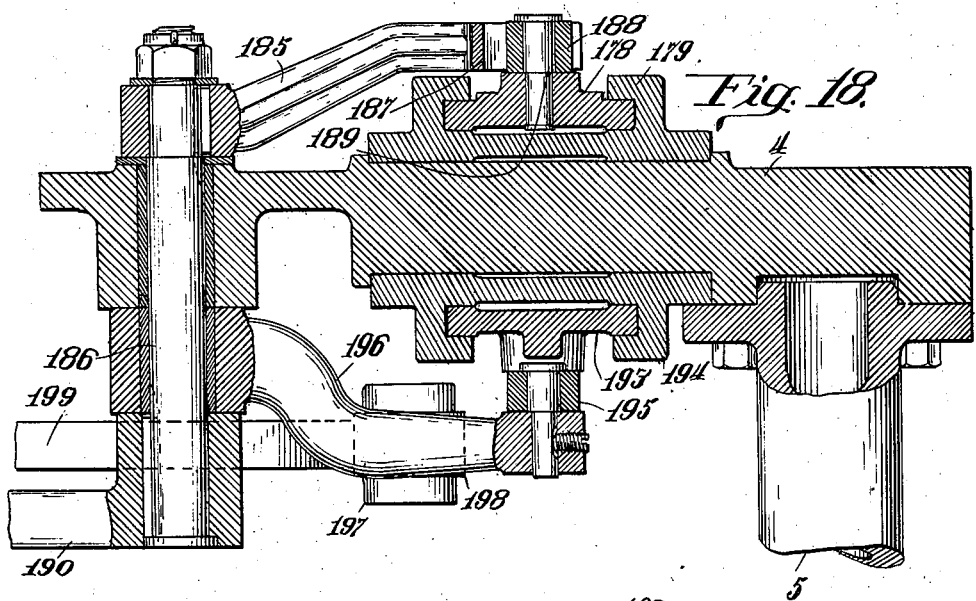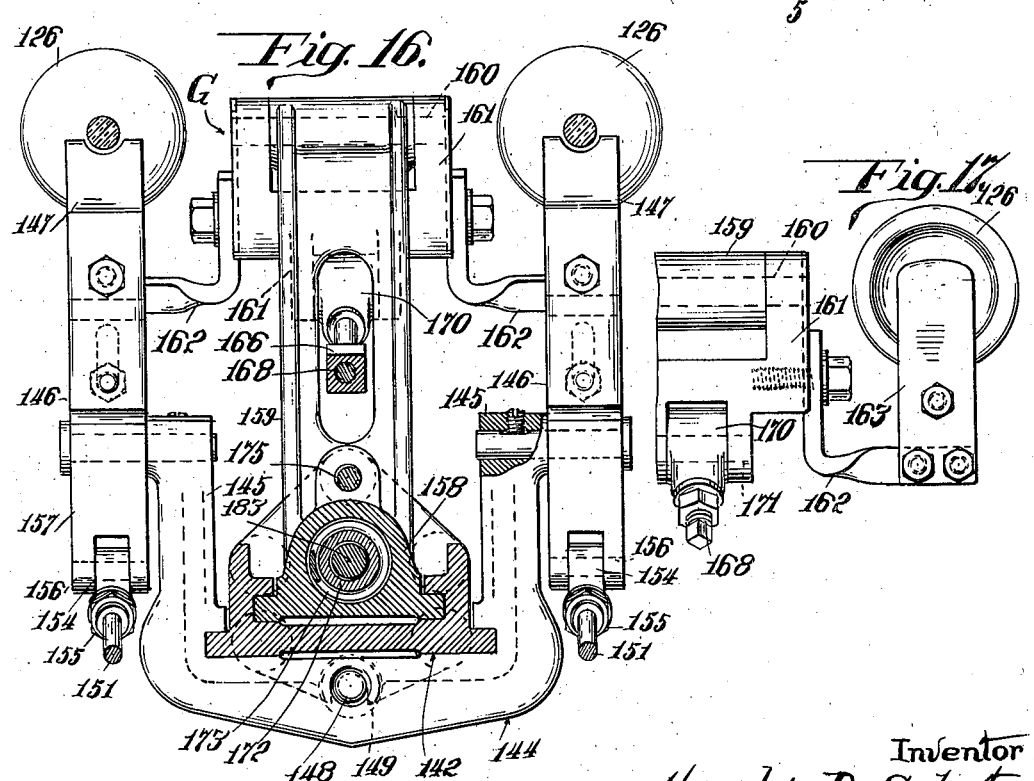

Patented May 14, 1935

2,001,436

UNITED STATES PATENT OFFICE 2,001,436

MACHINE FOR FLARING GLASS ARTICLES

Harold R. Schutz, Ottawa Hills, Ohio, assignor to The Libbey Glass Manufacturing Company, Toledo, Ohio, a corporation of Ohio Application March 25, 1933, Serial No. 662,767

22 Claims. (Cl. 49—7)

This invention relates to certain new and useful improvements in a machine for flaring glass articles, and more particularly to an improved mechanism for automatically reshaping the supporting foot or base on glass stemware such as goblets or tumblers.

In the ordinary process of making glassware of this type, the supporting foot or base is pressed to shape and simultaneously welded to the bottom of the hollow blown glass article. This foot member in its original form is substantially hemispherical and convexed away from the blown glass article to which it is affixed. This foot is afterwards flared outwardly to a more nearly flat form and at the same time the foot member is smoothed out or polished to remove the mold marks formed during the pressing operation.

The machine hereinafter described and forming the particular subject matter of this invention is adapted to perform this flaring and smoothing operation. It will be apparent as the description progresses that the mechanism could be adapted for flaring or reshaping other glass articles and the claims are intended to cover all such adaptations.

The improved flaring mechanism comprises, in combination with means for supporting the glass article and rotating it about its longitudinal axis, a pair of flaring tools one of which is moved into position behind the foot member (that is at the convex side thereof), and the other being movable into the concave side of the article so that one end of the tool engages or substantially engages the article substantially at the axis of rotation thereof. This latter tool is then swung about this inner end toward a position perpendicular to the axis of rotation thus spreading or flaring the foot member outwardly. It will be understood that the foot portion of the glass article must be reheated just prior to this flaring operation so that it will be softened sufficiently to permit this re-shaping operation. The contact of the two relatively fixed tools with the rotating glass article serves to smooth or polish both surfaces of the article and remove the mold marks.

The machine herein disclosed as a preferred form of the invention is entirely automatic except for the operations of inserting the glass articles in the machine and removing the finished articles after the flaring operation has been performed. Briefly described the machine comprises a rotating or swinging table carrying a plurality of chuck mechanisms which support and rotate the glass articles, the table being adapted to move the articles alternately between a flaring station and a re-heating station with a suitable dwell at each station. The heating mechanism and the flaring mechanisms are automatically moved into operative relation to the glass articles when these articles have been properly positioned at the respective stations. The article-holding mechanisms automatically cease rotating and release the articles when the flaring operation has been completed, and when new glass articles are placed in the machine the articles are gripped and rotated and the subsequent operations are performed automatically.

The principal object of this invention is to provide an improved flaring machine for glass articles, such as briefly described hereinabove and disclosed more in detail in the specifications which follow.

Another object is to provide an improved flaring mechanism for spreading and smoothing the foot portion of glass articles.

Another object is to provide improved mechanism for re-heating the glass articles preparatory to the flaring operation.

Another object is to provide improved chuck mechanism for supporting and rotating the glass articles.

Another object is to provide improved means for alternately transferring the glass articles between the flaring and the heating stations.

Another object is to provide improved means for adjusting the mechanism to accommodate glass articles of differing forms and sizes.

Another object is to provide improved means for cooling the flaring tools.

Other objects and advantages of this invention will be more apparent from the following detailed description of one approved form of apparatus constructed and operating according to the principles of this invention.

In the accompanying drawings:

Fig. 2 is a central longitudinal vertical section, taken substantially on the line 2—2 of Fig. 3.

Fig. 3 is a plan view of the machine.

Fig. 4 is an enlarged detail section through the yieldable driving connection for the table, the view being taken substantially on the line 4—4 of Fig. 2.

Fig. 5 is an inverted horizontal section, taken substantially on the line 5—5 of Fig. 1 and looking upwardly in the direction of the arrows.

Fig. 6 is a detail vertical section taken substantially on the line 6—6 of Fig. 5.

Fig. 7 is a horizontal section taken substantially on the line 7—7 of Fig. 1.

Fig. 8 is a detail horizontal section on a larger scale, taken substantially on the line 8—8 of Fig. 2 looking upwardly in the direction of the arrows.

Fig. 9 is a perspective view of the rack sector and cam-engaging roller shown in Fig. 8.

Fig. 10 is an enlarged vertical section taken substantially on the line 10—10 of Fig. 3.

Fig. 11 is a detail vertical section taken substantially on the line 11—11 of Fig. 10.

Fig. 12 is a vertical section on a still larger scale, taken substantially on the line 12—12 of Fig. 10.

Fig. 13 is a horizontal section taken substantially on the line 13—13 of Fig. 12.

Fig. 14 is a detail vertical section taken substantially on the line 14—14 of Fig. 13.

Fig. 15 is an enlarged side elevation of the flaring mechanism, similar to the upper right-hand portion of Fig. 2, but showing a different operative position of the mechanism.

Fig. 16 is a detail vertical section taken substantially on the line 16—16 of Fig. 15.

Fig. 17 is a detail view of one of the flaring tools, the view being taken looking in the direction of the arrow x in Fig. 15.

Fig. 18 is a detail vertical section on an enlarged scale taken substantially on the line 18—18 of Fig. 10.

Figs. 19, 20 and 21 are similar diagrammatic views illustrating three successive positions of the flaring tools.

Figure 1:
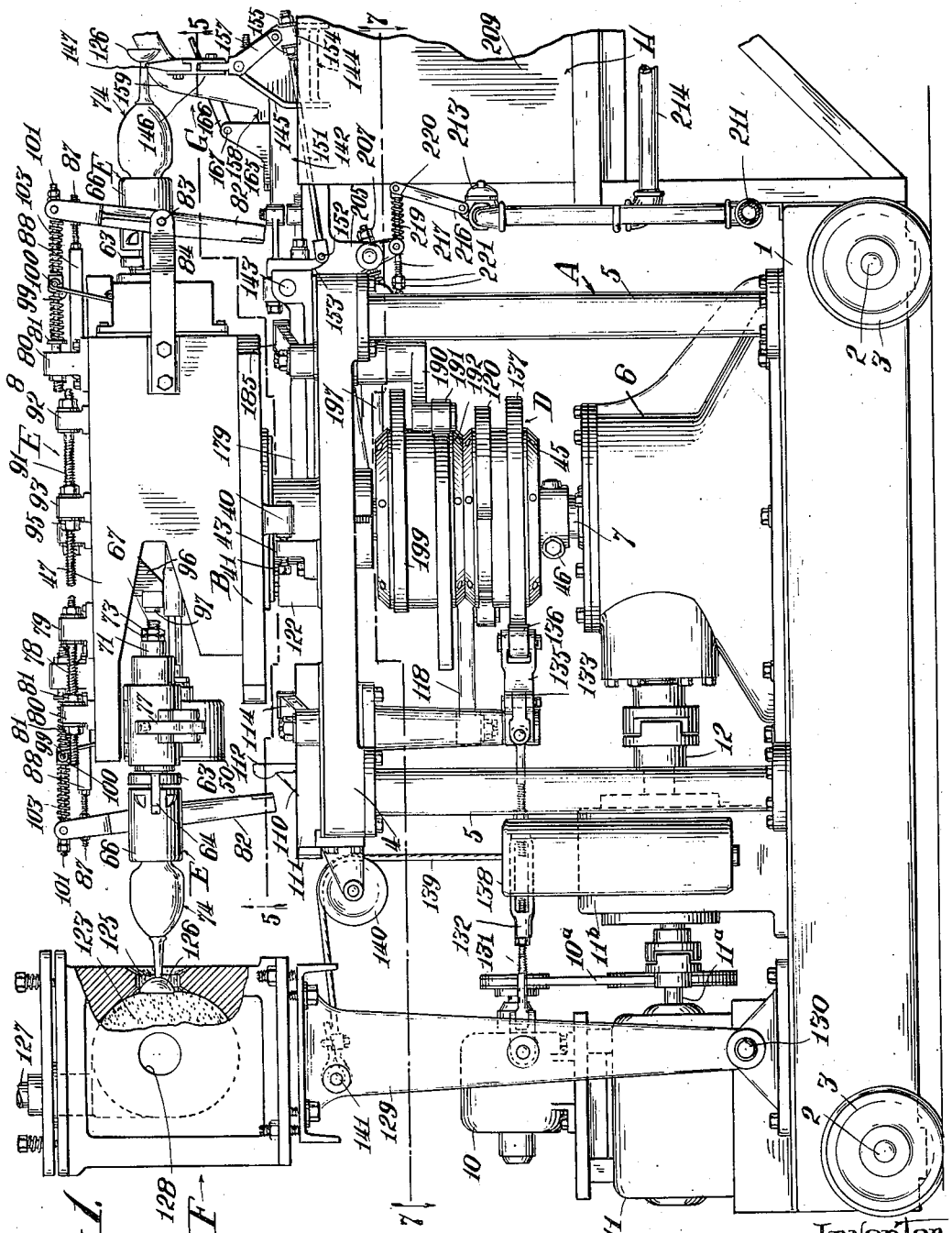
Fig. 1 is a side elevation of the machine with a portion of the flaring mechanism broken away at the right hand side of the figure.

Briefly described, the machine comprises a fixed supporting frame A, a supporting table B which is adapted to be swung or oscillated between two fixed positions at each of which it dwells for a certain period of time, and a driving mechanism indicated generally at C for oscillating the table B and continuously rotating the cam assembly indicated at D which successively imparts movements in properly timed relation to various other portions of the mechanism. A pair of similar chuck assemblies indicated generally at E are carried by the table B, each chuck assembly supporting and rotating a pair of the glass articles to be flared. A furnace or reheating mechanism F and the flaring mechanism indicated generally at G are mounted on the fixed frame A and positioned at separate stations at opposite sides of the table B so that the article-supporting mechanisms E may be brought alternately into position to cooperate with the furnace and flaring mechanism at these two stations. A cooling mechanism indicated at H is adapted to cooperate with the flaring tools when the mechanism G is swung down to inoperative position as shown in Fig. 2.

The fixed supporting frame A comprises a lower platform 1 preferably mounted on axles 2 provided with wheels 3 so that the machine may be moved as a unit from one position to another. An upper platform 4 is supported by means of a plurality of posts or columns 5 from the lower platform 1, and the fixed supporting structure A also includes a gear casing 6 and a plurality of supporting brackets positioned intermediate the platforms 1 and 4 for supporting various portions of the mechanisms. A vertical sleeve 7 positioned centrally of the machine is rotatably journaled in upper and lower bearings 8 and 9 in the frame A. The sleeve 7 is continuously rotated from the main driving motor 10 through gearing 10ª, change speed gear box 11, shaft 11ª, reduction gearing 11ᵇ, shaft 12, bevel pinion 13 and bevel gear 14 keyed on the sleeve 7.

The supporting table B is provided with a downwardly projecting sleeve portion 15 (see Figs. 2 and 6) journaled in a bearing 16 in frame A. The vertical driving shaft 17 extends through sleeve 7 and is supported at its lower end in bearing 18 in frame A, the upper end of shaft 17 being rotatably journaled in table B but normally turning therewith. A gear 19 keyed on the lower portion of shaft 17 meshes with a rack sector 20 journaled on stub shaft 21 and carrying a cam roller 22 which engages in the cam slot 23 in the cam disk 24 rotatably journaled at 25 on the lower portion of sleeve 7. (See Figs. 2, 8 and 9). The cam disk 24 is rotated at a reduced speed from sleeve 7 through gear 26 keyed on sleeve 7 which meshes with pinion 27 journaled on stub shaft 28, the pinion meshing with an internal gear 29 secured on the upper face of cam disk 24. The cam slot 23 (see Fig. 8) comprises two concentric portions 30 and 31 of equal arcuate length, joined by two eccentric portions 32 and 33. Although the cam disk 24 rotates continuously, when roller 22 is in the concentric portions 30 and 31 of the cam slot shaft 17 and table B will be stationary. As roller 22 passes through the eccentric portions 32 and 33 of the cam slot, the rack 20 will be swung in one direction or the other to rotate shaft 17 through approximately 180°. A crank arm 34 (see Figs. 3, 4 and 6) is keyed on the upper end of shaft 17 with the head 35 at the free end of the crank extending between a pair of lugs 36 extending upwardly from table B. Adjustable screws 37 mounted in lugs 36 are adapted to engage yieldable plungers 38 mounted in head 35 and normally forced apart by the spring 39. A stop member 40 extending downwardly from the lower surface of table B is adapted to engage alternatively with a pair of stop screws 41 and 42 adjustable in supporting lugs or brackets 43 and 44 mounted on the upper fixed platform 4. It will now be seen that the shaft 17 and table B will be oscillated as a unit through an arc of substantially 180° until the stop 40 on the table engages one or the other of the fixed stops 41 or 42. The yieldable shock-absorber 39 in crank arm 34 will permit some additional movement of the shaft 17 and crank arm 34 after the table B has been stopped in the desired position.

The cam assembly D comprises a cam drum 45 which is secured at 46 on the sleeve 7 so that the series of cams carried by the drum 45, and hereinafter described, will be continuously rotated. The cams D make one complete rotation for each 180° movement of the table B, that is one complete cycle of operations of the parts operated by the cams takes place while the table is in each of its alternate positions, or while moving from one of these positions to the other.

A pair of similar article-holding mechanisms or chuck mechanisms E are similarly positioned on the table B but at opposite sides of the central vertical axis and oppositely directed so that when the table is moved through 180° from one of its positions to the other these mechanisms E will exactly change places with one another. Since these two mechanisms E are identical, a description of one will suffice for both. Each mechanism E comprises two similar separate chucks which are simultaneously operated, and the furnace F and the flaring mechanism G also each comprise similar duplicate parts, thus doubling the capacity of the machine.

Each mechanism E comprises a supporting frame 47 mounted on table B, said frame being formed with a slideway 48 in which is mounted the slide 49 to which the gear casing 50 is attached by screw bolts 51. A shaft 52 journaled in bearing 53 in the central rear portion of the casing 50 has a non-circular rearwardly extending portion 54 which telescopes within the drive shaft 55 driven from motor 56 through the reduction gearing in housing 57. Each chuck comprises a sleeve member 58 journaled in a bearing 59, the sleeve being formed with a gear 60 on its inner end which meshes with an idler gear 61 which in turn meshes with drive gear 62 keyed on the inner end of shaft 52. Through this train of gearing each chuck will be simultaneously driven when motor 56 is in operation. The outer end of sleeve 58 is formed with a supporting head 63 in which are pivoted the inner ends of a pair of similar links 64, the outer end of each link being pivoted between a pair of ears 65 formed in the rear end portion of one of a pair of similar clutch jaws 66. (See Fig. 14). The forward end of a push rod 67 slidably mounted in sleeve 58 is pivoted by pin 69 to the several overlapping ears 70 formed on the two jaw members 66. The rear portion of push rod 67 extends through a sleeve 71 journaled in the rear portion of housing 50. A spring 72 is confined between sleeve 71 and gear 60, the opposite end of sleeve 71 abutting against a pair of adjusting nuts 73 by means of which the compression of spring 72 is adjusted. The spring 72 tends to pull the rod 67 rearwardly thus holding the clutch jaws 66 together. It will be apparent that if the push rod 67 is forced in the opposite direction, in opposition to spring 72, the jaws 66 will be swung apart as indicated in dotted lines in Fig. 13 thereby releasing the glass article indicated at 74. This glass article may then be removed and replaced by a new article to be flared, and as soon as the pressure against rod 67 is relieved, the spring 72 will again close the jaws 66. The portions of housing 50 in which each chuck assembly is journaled comprises a movable section 75 hinged at 76 and held in closed position by the spring-actuated latch 77. By releasing the latch 77 and swinging back the bearing section 75, the chuck assembly may be removed as a unit. This permits chucks of different sizes and shapes to accommodate a variety of glass articles being interchangeably used in the machine. An adjusting screw 78 rotatable in a fixed bearing 79 in frame 47, is threaded through a lug 80 projecting upwardly from slide 49, the parts being locked in adjusted position by nuts 81 at either side of the lug 80. By this means the slide 49 which supports the chuck assemblies may be adjusted longitudinally to properly position the glass articles to be flared with respect to the flaring mechanism G hereinafter described. It will be noted that the telescoping drive shaft sections 54 and 55 will permit this adjustment without affecting the operation of the means for rotating the chucks.

At the opposite side of table B from the chucks 66, an operating lever 82 is intermediately pivoted at 83 to a bracket 84 extending from supporting frame 47. The upper arm of lever 82 is pivotally connected to a block 85 adjustably mounted by nuts 86 on the screw 87 projecting rearwardly from link 88 which is pivoted at 89 to a slide 90 mounted in fixed frame 47. An adjusting screw 91 rotatably journaled in a lug 92 projecting upwardly from slide 90 is threaded through an ear 93 on a second slide 94 also movably mounted in the frame 47. The screw is locked in adjusted position by the nuts 95 at either side of lug 93. The bracket 96 projecting downwardly from the forward end of slide 94 carries a pair of abutments 97 which are aligned with the rearwardly projecting ends of the push rods 67 in the two chuck members. As the two slides 90 and 94 are moved forwardly by the operating lever 82, the abutments 97 will engage the push rods 67 and open the clutch jaws. The normal path of travel of the slide 90 is relatively fixed, but after the position of the chuck assemblies has been adjusted by means of screw 78, the intermediate slide 94 is adjusted by means of screw 91 so that the abutments 97 will be in proper operative relation to the push rods 67.

The chuck rotating motor 56 is controlled by a switch 98 mounted on frame 47, the switch being thrown to open or closed positions by an arm 99 pivoted at its upper end 100 to an operating rod 101 which projects through a block 102 pivotally connected with the upper end of operating lever 82. A spring 103 is confined between the block 102 and the enlarged portion 104 of rod 101 to which arm 99 is pivotally connected. The parts are held in this position by the nuts 105 threaded on the rear end of rod 101. In the positions shown in Fig. 10, the switch is closed and the motor is operating. A stop 106 is adjustably positioned in alignment with the rod 101 by means of screw 107 mounted in lug 108 on the fixed frame 47. A spring 109 which is weaker than the spring 103 is confined between block 104 and the stop pin 106. When the upper end of operating lever 82 (Fig. 10) is swung toward the right, the switch lever 99 will also be moved to the right (compressing spring 109) until the rod 101 engages the stop 106, before which time the switch will be opened. Further movement of lever 82 to the right will simply slide the block 102 along the rod 101 compressing the spring 103. This additional movement of lever 82 will move the slides 90 and 94 sufficiently to cause the projections or buttons 97 to force in the push rods 67 and open the clutch jaws 66. An operating slide 110 is mounted in a slideway 111 (Figs. 10 and 11) mounted on upper platform 4 of the frame A in such position that the upwardly projecting lug 112 on this slide will be positioned in alignment with one or the other of the operating levers 82 of the chuck assemblies. The slide 110 is normally moved to the inoperative position shown in Fig. 10 by the spring 113. A crank arm 114 secured to the upper end of a vertical shaft 115 has its forked outer end 116 engaged about a block 117 pivotally mounted on slide 110. A crank arm 118 secured on the lower end of shaft 115 carries a roller 119 which is adapted to be engaged by the cam 120 carried by cam drum 45. This cam is so positioned that just after a flaring operation has been completed (as hereinafter described) and the flaring mechanism G has been moved downwardly out of engagement with the glass articles, the slide 110 will be moved outwardly to engage lever 82 and swing this lever in a clockwise direction (Fig. 10) so as to first stop the motor 56 and then open the clutch jaws 66. The dwell of the cam is sufficient to permit the finished glass articles to be removed and new articles to be positioned in the chuck. The slide 110 will then be permitted to move back whereupon the several springs will return the chuck-operating mechanisms to the normal position shown in Fig. 10, first closing the chucks and then closing switch 98 to again cause rotation of the chucks and the glass articles carried thereby.

In the example here shown, the motors 56 are operated by three-phase alternating currents, the motors being connected with a series of circular slip rings 121 mounted in the under face of table B concentric with shaft 17. A stationary contact box 122 mounted on platform 4 has brushes slidably bearing on the slip rings 121. The power supply line leads to the contact box 122.

The re-heating furnace F (see Figs. 1, 3 and 7) comprises a pair of similar combustion chambers 123 separated by partition 124, each chamber having a front opening 125 through which the foot portion 126 of the glass article 74 to be heated is projected. A constantly burning gas torch or similar heating device 127 projects into the upper portion of each chamber 123, and the interior walls of the chamber are curved so as to cause a whirling circulation of the heated gases within the chamber. Combustion openings 128 are formed in the side walls of the chambers and in the intermediate partition 124.

This furnace assembly is mounted at the upper end of a standard 129 pivotally mounted at its lower end 130 on the lower platform 1 of the supporting frame A. An adjustable link 131, comprising the turnbuckle 132, connects the standard 129 with one arm of a lever 133 fulcrumed at 134 in the frame and having an arm 135 carrying a roller 136 which bears against the cam 137 mounted in cam drum 45. This furnace or gloryhole assembly is normally held in the upright operative position shown in Fig. 1 by the weight 138 suspended from cable 139 passing over guide sheave 140 and connected at 141 to the standard 129. When the high portion of cam 137 engages the roller 136, the furnace F will be swung back so that the glass articles will be withdrawn from the openings 125 and the table B carrying the glass articles may be rotated to bring the re-heated articles into operative relation to the flaring mechanism G, and to bring another pair of glass articles into position to be re-heated. The furnace F will then swing back to the position shown in Fig. 1.

The flaring mechanism G is mounted on a main supporting frame 142 pivoted at 143 to the stationary supporting platform 4 so that the flaring mechanism as a unit may be swung from the operative position shown in Figs. 10 and 15 to the inoperative position shown in solid lines in Fig. 2. A carriage 144 slidably mounted on frame 142 comprises a pair of upwardly extending arms 145 to each of which is pivoted one of the levers 146 which supports the carbon smoothing and backing tools 147 which are adapted to engage behind or above the foot members 126 of the glass articles. The position of carriage 144 on supporting frame 142 is adjusted by means of an adjusting screw 148 which has a bearing at 149 in a fixed bracket 150 on frame 142. The adjustable links 151 are pivoted at their rear ends 152 to brackets 153 on the fixed supporting frame 4. Blocks 154 are adjustably positioned on links 151 by means of nuts 155 threaded on the links, and these blocks are pivotally connected at 156 with the lower arms 157 on the tool supporting levers 146. This link and lever mechanism comprises a parallel motion device for causing the tools 147 to move vertically downward and clear the foot members 126 when the flaring mechanism is swung down to the inoperative position shown in Fig. 2. Aside from this small swinging motion, the backing tools 147 may be considered as substantially fixed, once their position has been properly adjusted by means of the screw 148. During the flaring operation, as hereinafter described, the tools 147 do not move.

The carriage 158 slidably mounted in frame 142 supports an upwardly and forwardly projecting standard 159, in the upper end of which is pivoted at 160 a frame 161 carrying a pair of oppositely projecting brackets 162 which support the carbon flaring tools 163. It will be noted that the upper end portions 164 of the flaring tools 163 are positioned substantially in the pivotal axis 160 of the frame 161 and also in the projected axes of rotation of the glass articles to be flared. A slide 165 mounted in frame 142 behind the carriage 158 is connected with the swinging tool-carrying frame 161 by means of an adjustable link comprising the link member 166 pivoted to slide 165 at 167 and the screw 168 adjustably threaded in member 166 and having a bearing at 169 in a block 170 pivoted at 171 in the lower portion of swinging frame 161. A sleeve 172 is fixed in the slide 165 and projects forwardly through the carriage 158, a spring 173 surrounding this sleeve being confined between a portion of the carriage 158 and a collar 174 on the forward end of the sleeve. The spring 159 normally holds the slide 165 and carriage 158 together to move as a unit, but this spring may be compressed to permit movement of the slide 165 independently of the carriage 158. A stop screw 175 adjustably threaded in carriage 158 is slidable through an opening 176 in the fixed bracket 150, and is provided with a head 177 which engages the bracket 150 to limit rearward movement of the carriage 158.

An operating slide 178 mounted in slideway 179 on supporting platform 4 is normally urged to the inoperative position shown in Fig. 10 by a spring 180. A block 181 is pivoted to slide 178 at 182 coaxially with the pivotal axis 143 of swinging frame 142 so that the swinging movements of the frame will not cause any movement of the slide mechanism carried thereby. An adjustable screw rod 183 is threaded in the sleeve 172 and has a bearing at 184 in block 181. It will be apparent that as the slide 178 is pulled rearwardly, or to the left in Fig. 10, it will through rod 183 pull the slide 165 and carriage 158 in the same direction. A crank arm 185 secured at the upper end of a vertical shaft 186 journaled in platform 4 has its forked end portion 187 engaged about a roller or block 188 pivoted at 189 on slide 178. (See Fig. 18). A crank arm 190 keyed on the lower end of shaft 186 carries a roller 191 which engages the cam 192 fixed in the cam drum 45. When the high portion of cam 192 engages the roller 191, the slide 178 will be moved to the left as shown in Fig. 15. This movement of slide 178 will cause the slide 165 and carriage 158 to be moved to the left as a unit until stop 177 engages the fixed bracket 150 at which time the upper end portions 164 of the two flaring tools 163 will be positioned against or closely adjacent the central bottom portions of the foot members 126 of the glass articles. Further movement of the slides 178 and 165 toward the left will cause slide 165 to move independently of carriage 158 compressing the spring 173, and through link 168 swinging the frame 161 about its pivotal axis 160 so as to swing the two flaring tools 163 about their relatively fixed upper ends 164 toward a radial position or a position at right angles to the axes of rotation of the glass articles.

The actual operation of flaring the glass foot will perhaps be better understood by reference to Figs. 19, 20 and 21. It will be understood that throughout this flaring operation the glass article is being continuously rotated about its longitudinal axis. In Fig. 19 is illustrated the relative position of the glass article and the flaring tools 147 and 163 when the tools have first been moved up into alignment with the article. In Fig. 20 the flaring tool 163 has been moved toward the glass foot 126 so that the head 164 of the tool projects into the concaved side of the foot and is in contact with or closely adjacent the surface of the glass article substantially in the axis of rotation of the article. In Fig. 21 the flaring tool 163 has been swung down about its relatively fixed upper end 164 toward a position perpendicular to the axis of rotation of the article. It will be apparent that during this swinging movement the tool 163 will engage the lower surface of the reheated and relatively plastic glass foot 126 and will spread or flare the foot outwardly to the position indicated in Fig. 21. During this flaring operation, the two tools 147 and 163 will engage the upper and lower surfaces of the glass foot 126 and smooth or polish the same, obliterating the mold marks that were left from the pressing operation. After this flaring operation has been completed, the roller 191 will run onto the low portion of cam 192, thus permitting the several springs to return the parts to their original positions, the flaring tools moving successively back to the position shown in Fig. 20 and then Fig. 19, and eventually being swung down away from the glass article by the mechanism that will now be described.

An operating slide 193 (Figs. 7, 10, 15 and 18) is movable in a slideway 194 supported from the lower surface of platform 4. This slide is connected by a link 195 with a lever 196 which is pivoted on the vertical shaft 186, the lever 196 having an arm 197 carrying a roller 198 which bears against the cam 199 fixed in cam drum 45. A link 200 has its head 201 pivoted at 202 to the slide 193, the link being slidable through a block 203 which is pivotally mounted at 204 between the crank arms 205 extending downwardly and outwardly from the main supporting frame 142 for the flaring mechanism G. A rather stiff compression spring 206 is confined about link 200 between the head 201 and the block 203. Outward movement of block 203 is limited by the nuts 207 adjustable on the threaded end 208 of link 200. As roller 198 runs onto the high portion of cam 199, the slide 193 will be moved outwardly and through link 200 and spring 206 will swing the frame 142 and the flaring mechanism carried thereby up to the normal operating position. Suitable stops are provided to prevent movement of frame 142 beyond this horizontal position, and excessive movement of the operating levers and slide 193 may be permitted by compression of the spring 206. When roller 198 runs off of the high portion of cam 199, the flaring mechanism will be permitted to swing down to the inoperative position shown in solid lines in Fig. 2.

The cooling mechanism H comprises a tank 209 which has a portion of its rear wall cut away at 210 (Fig. 10) so that the flaring mechanism G may swing down into this tank. A pipe 211 is connected by a flexible conduit 212 with a suitable source of water supply. Pipe 211 leads to a control valve 213 from which branch pipes 214 lead to spraying devices 215 so positioned as to be directed against the flaring tools when the mechanism G is lowered into the tank H. The valve operating crank 216 is pivotally connected at its upper end to a link 217 which is slidable through a block 218 pivoted between the lower end portions of the crank arms 205 of frame 142. A spring 219 is confined between the block 218 and the head 220 of link 217, and adjustable nuts 221 are mounted on the other threaded end portion of this link. When the frame 142 is swung up to its normal operative position, the block 218 will engage spring 219 and move the crank arm 216 to a position to close the valve 213 and shut off the flow of water to the sprayers 219. When the flaring mechanism G is swung down to the inoperative position, the block 218 will engage nuts 221 and swing the valve crank 216 so as to open the valve and cause the sprayers 215 to project streams of cooling water against the flaring tools. This water will be collected in tank H and will flow out through drain pipe 224.

In the general operation of this machine, the several operating cams carried by drum 45 are so relatively positioned that the operations hereinabove described will take place in the following order, assuming that a flaring operation has just been completed on one pair of the glass articles: The flaring mechanism G will swing down, the cooling mechanism will be put in operation, the spindles will cease rotating and the chucks will open thus permitting the attendant to withdraw the finished articles and insert a new pair in the chucks. The chucks will now close, the spindles will again start rotating, and the furnace F will be moved back away from the pair of articles that have been reheating. The table B will now swing through 180°, bringing the new pair of articles into alignment with the furnace or gloryholes, and swinging the reheated pair of articles into position at the flaring station. When this movement has been completed, the flaring mechanism G will swing up into operative relation with the last mentioned pair of glass articles, and the furnace will swing into position to reheat the new pair of glass articles. The flaring operation will now be performed by the mechanism G and one cycle of operations has been completed. It will be noted that there will normally be four of the glass articles in the machine at any one time, one pair of articles being flared while another pair is being reheated preparatory to the next following flaring operation. The operation is continuous and entirely automatic except for the removal of the finished articles and the insertion of a new pair of articles into the machine.

It will be noted that the glass-engaging surfaces 222 of the backing tools 147 are positioned at an angle corresponding to the desired inclination of the rear or upper surfaces of the flared foot members 126, and the operating parts are so adjusted that the glass-engaging surfaces 223 of the flaring tools 163 will correspond to the desired inclination of the front or bottom surfaces of the foot members when these tools are swung down to their final limiting positions. By varying the inclinations and contours of these glass-engaging tools and properly adjusting the operating links a variety of different forms may be given to the foot members 126 or other articles to be flared.

It will be noted that during the reheating and flaring operations the glass article is being continuously rotated about its central longitudinal axis so that centrifugal force tends to cause the plastic glass of the foot portion to move outwardly thus initiating and assisting the flaring operation. If the speed of rotation and temperature of the glass is sufficient the shaping tools may only be necessary for truing and smoothing the foot and giving it its final form.

I claim:

1. In a machine for flaring glass articles, means for supporting and rotating the article to be flared, a backing tool and a flaring tool bodily movable toward and from one another, means for supporting the tools and moving them as a unit toward the axis of rotation of the article and into position at opposite sides of the glass article to be flared, means for moving the flaring tool into engagement with the article so that one end of the tool is positioned substantially in the axis of rotation of the article, and means for swinging the flaring tool about the first mentioned end toward a position perpendicular to the axis of rotation of the article.

2. In a machine for flaring glass articles, means for supporting and rotating the article to be flared, a backing tool and a flaring tool bodily movable toward and from one another, means for supporting the tools and moving them as a unit toward the axis of rotation of the article and into position at opposite sides of the glass articles to be flared, and means for moving the flaring tool toward the article and for swinging the flaring tool toward the backing tool.

3. In a machine for flaring glass articles, means for supporting and rotating the article to be flared, a backing tool and a flaring tool bodily movable toward and from one another, means for supporting the tools and moving them as a unit toward the axis of rotation of the article and into position at opposite sides of the glass article to be flared, and means for bodily moving one end of the flaring tool toward the backing tool and then swinging the flaring tool about this end toward the backing tool.

4. In a machine for flaring glass articles, a chuck for holding and rotating the article to be flared, and a flaring mechanism comprising a backing tool movable into position behind the part to be flared, a flaring tool, a carriage on which the flaring tool is pivotally mounted so that it will swing about one end of the tool positioned substantially in the axis of rotation of the article, an operating slide, means for moving the slide, a link connection between the slide and the flaring tool, a yieldable connection between the slide and carriage, and a stop for the carriage, movement of the slide in one direction drawing the carriage and flaring tool and bringing the pivoted end of the flaring tool into engagement with the article at which time the carriage engages the stop, further movement of the slide swinging the flaring tool toward a position perpendicular to the axis of rotation of the article.

5. In a machine for flaring glass articles, a chuck for holding and rotating the article to be flared, and a flaring mechanism comprising a backing tool movable into position behind the part to be flared, a flaring tool, a carriage on which the flaring tool is pivotally mounted so that it will swing about one end of the tool positioned substantially in the axis of rotation of the article, an operating slide, means for moving the slide, a link connection between the slide and the flaring tool, a yieldable connection between the slide and the carriage, and a stop for the carriage, movement of the slide in one direction drawing the carriage and flaring tool and bringing the pivoted end of the flaring tool into engagement with the article at which time the carriage engages the stop, further movement of the slide swinging the flaring tool toward a position perpendicular to the axis of rotation of the article, and cam-operated means for moving the slide.

6. In a machine for flaring glass articles, a chuck for holding and rotating the article to be flared, and a flaring mechanism comprising a swinging frame, a backing tool mounted on the frame and moved into operative relation with the article when the frame is swung to operative position, a carriage slidably mounted in the frame, a flaring tool pivotally mounted in the carriage to swing about one end which is positioned substantially in the axis of rotation of the article, an operating slide, means for moving the slide, a link connection between the slide and the flaring tool, a yieldable connection between the slide and carriage, and a stop for the carriage, movement of the slide in one direction first drawing the carriage to such position that it engages the stop at which time the pivoted end of the flaring tool is adjacent the surface of the article to be flared, further movement of the slide swinging the flaring tool toward a position perpendicular to the axis of rotation of the article.

7. In a machine for flaring glass articles, a chuck for holding and rotating the article to be flared, and a flaring mechanism comprising a movable frame, a backing tool mounted on the frame and moved into operative relation with the article when the frame is moved to operative position, a carriage slidably mounted in the frame, a flaring tool pivotally mounted in the carriage to swing about one end which is positioned substantially in the axis of rotation of the article, an operating slide, means for moving the slide, a link connection between the slide and the flaring tool, a yieldable connection between the slide and carriage, and a stop for the carriage, movement of the slide in one direction first drawing the carriage to such position that it engages the stop at which time the pivoted end of the flaring tool is adjacent the surface of the article to be flared, further movement of the slide swinging the flaring tool toward a position perpendicular to the axis of rotation of the article.

8. In a machine for flaring glass articles, a chuck for holding and rotating the article to be flared, and a flaring mechanism comprising a swinging frame, a backing tool mounted on the frame and moved into operative relation with the article when the frame is swung to operative position, a carriage slidably mounted in the frame, a flaring tool pivotally mounted in the carriage to swing about one end which is positioned substantially in the axis of rotation of the article, an operating slide, means for moving the slide, a link connection between the slide and the flaring tool, a yieldable connection between the slide and carriage, a stop for the carriage, movement of the slide in one direction first drawing the carriage to such position that it engages the stop at which time the pivoted end of the flaring tool is adjacent the surface of the article to be flared, further movement of the slide swinging the flaring tool toward a position perpendicular to the axis of rotation of the article, and cam operated mechanisms for swinging the frame and operating the slide.

9. In a machine for flaring glass articles, a chuck for holding and rotating the article to be flared, and a flaring mechanism comprising a swinging frame, a backing tool mounted on the frame and moved into operative relation with the article when the frame is swung to operative position, a carriage slidably mounted in the frame, a flaring tool pivotally mounted in the carriage to swing about one end which is positioned substantially in the axis of rotation of the article, an operating slide, means for moving the slide, a link connection between the slide and the flaring tool, a yieldable connection between the slide and carriage, a stop for the carriage, movement of the slide in one direction first drawing the carriage to such position that it engages the stop at which time the pivoted end of the flaring tool is adjacent the surface of the article to be flared, further movement of the slide swinging the flaring tool toward a position perpendicular to the axis of rotation of the article, and means for cooling the tools when swung to inoperative position.

10. In a machine for flaring glass articles, a chuck for holding and rotating the article to be flared, and a flaring mechanism comprising a swinging frame, a backing tool mounted on the frame and moved into operative relation with the article when the frame is swung to operative position, a carriage slidably mounted in the frame, a flaring tool pivotally mounted in the carriage to swing about one end which is positioned substantially in the axis of rotation of the article, an operating slide, means for moving the slide, a link connection between the slide and the flaring tool, a yieldable connection between the slide and carriage, a stop for the carriage, movement of the slide in one direction first drawing the carriage to such position that it engages the stop at which time the pivoted end of the flaring tool is adjacent the surface of the article to be flared, further movement of the slide swinging the flaring tool toward a position perpendicular to the axis of rotation of the article, and means for cooling the tools comprising a tank into which the frame swings when moved to inoperative position, spraying means, a valve controlling the spraying means, and operating connections between the valve and swinging frame.

11. In a machine for flaring glass articles, in combination with a flaring mechanism, means for supporting the glass article in operative relation to the flaring mechanism comprising a supporting frame, a carriage adjustable on the frame, a chuck spindle rotatably mounted in the carriage, means for rotating the spindle, a pair of chuck jaws pivotally mounted on the spindle, a push-rod mounted in the spindle and connected with the jaws, a spring for urging the rod in one direction to hold the jaws closed, and automatically operating means for successively stopping the rotating means, moving the rod in opposition to the spring to open the jaws, releasing the rod to permit the jaws to close, and starting the rotating means.

12. In a machine for flaring glass aricles, in combination with a flaring mechanism, means for supporting the glass article in operative relation to the flaring mechanism comprising a supporting frame, a carriage adjustable on the frame, a chuck spindle rotatably mounted in the carriage, means for rotating the spindle, a pair of chuck jaws pivotally mounted on the spindle, a push-rod mounted in the spindle and connected with the jaws, a spring for urging the rod in one direction to hold the jaws closed, an adjustable slide mounted in the frame and comprising a member movable against the rod to open the jaws in opposition to the spring, and cam operated mechanism for moving the slide.

13. In a machine for flaring glass articles, in combination with a flaring mechanism, means for supporting the glass article in operative relation to the flaring mechanism comprising a supporting frame, a carriage adjustable on the frame, a chuck spindle rotatably mounted in the carriage, means for rotating the spindle, a pair of chuck jaws pivotally mounted on the spindle, a push-rod mounted in the spindle and connected with the jaws, a spring for urging the rod in one direction to hold the jaws closed, an adjustable slide mounted in the frame and comprising a member movable against the rod to open the jaws in opposition to the spring, the spindle rotating means comprising a driving motor, a switch for starting and stopping the motor, and cam-operated means for moving the slide and operating the switch.

14. In a machine for flaring glass articles, in combination with a flaring mechanism, means for supporting the glass article in operative relation to the flaring mechanism comprising a supporting frame, a carriage adjustable on the frame, a chuck spindle rotatably mounted in the carriage, means for rotating the spindle, a pair of chuck jaws pivotally mounted on the spindle, a push-rod mounted in the spindle and connected with the jaws, a spring for urging the rod in one direction to hold the jaws closed, an adjustable slide mounted in the frame and comprising a member movable against the rod to open the jaws in opposition to the spring, the spindle rotating means comprising a driving motor, a switch for starting and stopping the motor, and automatic means for controlling the switch and moving the slide to open or close the jaws.

15. A machine for flaring glass articles comprising a fixed supporting frame, a table rotatably mounted in the frame, chuck mechanisms mounted on the table for holding the articles to be flared, means for moving the table about its axis of rotation to bring the chuck mechanisms alternately to a heating station and a flaring station with a dwell at each station, a reheating furnace at the heating station movable into and out of operative position about a portion of the article to be heated, a flaring mechanism at the flaring station movable into and out of position at opposite sides of a portion of a reheated article, and means to automatically move the furnace and flaring mechanism into operative relation to the glass articles when the articles are brought to position at the respective stations and to withdraw the furnace and flaring mechanism to permit the table to be rotated to move the articles from one station to the other.

16. A machine for flaring glass articles comprising a fixed supporting frame, a table rotatably mounted in the frame, a chuck mechanism mounted on the table for holding the glass articles, said mechanism comprising a chuck adapted to be opened and closed and means for normally rotating the chuck, means for moving the table about its axis of rotation to bring the chuck alternately to a heating station and a flaring station, a reheating furnace at the heating station movable into and out of operative position about a portion of the article to be heated, a flaring mechanism at the flaring station movable into and out of position at opposite sides of a portion of a reheated article, means to automatically bring the furnace and the flaring mechanism into operative relation to the glass articles when the articles are brought to position at the respective stations and to withdraw the furnace and flaring mechanism to permit the table to be rotated to move the articles from one station to the other, and means for automatically stopping the chuck rotating means and opening the chuck while the chuck is dwelling at the flaring station.

17. A machine for flaring glass articles comprising a fixed supporting frame, a table rotatably mounted in the frame, a pair of similar oppositely directed chuck mechanisms mounted on the table for holding the glass articles, each comprising a chuck adapted to be opened and closed and means for normally rotating the chuck, means for moving the table about its axis of rotation to bring the chuck mechanisms alternately to a heating station and a flaring station with a dwell at each station, a reheating furnace at the heating station movable into and out of operable position about a portion of the article to be heated, a flaring mechanism at the flaring station movable into and out of position at opposite sides of a portion of a reheated article, means to automatically bring the furnace and the flaring mechanism into operative relation to the glass articles when the articles are brought to position at the respective stations and to withdraw the furnace and flaring mechanism to permit the table to be rotated to move the articles from one station to the other, and means for automatically stopping the chuck rotating means and opening the chuck while the chuck is dwelling at the flaring station.

18. A machine for flaring glass articles comprising a fixed supporting frame, a table rotatably mounted in the frame, a chuck mechanism mounted on the table for holding the glass articles, said mechanism comprising a chuck adapted to be opened and closed and means for normally rotating the chuck, means for moving the table about its axis of rotation to bring the chuck alternately to a heating station and a flaring station, a flaring mechanism at the flaring station, a reheating furnace at the heating station, a movable standard supporting the furnace, means for normally moving the standard toward the table to a position where the furnace partially encloses the glass articles, and cam-operated means for moving the standard away from the table while the table is swinging from one position to another.

19. In combination, in a machine for reshaping the partially formed foot of a glass article, an article holding means for rotating the article about its axis of revolution, means for heating the foot of the article, means for bringing the article and heating means into and out of operative relationship with one another, a movable shaping tool for applying controllable pressure to one surface of the rotating foot so as to cause the glass to move away from the axis of rotation of the foot, a second shaping tool adapted to be adjustably positioned at the side of the foot opposite from the first tool to resist said applied pressure and impart a predetermined surface of revolution to the foot, means to support and move the tools as a unit into and out of position to engage the foot, and means to move the first shaping tool into engagement with the foot and shape the foot against the second shaping tool.

20. In combination, in a machine for reshaping the partially formed foot of a glass article, an article holding means for rotating the article about its axis of revolution, means for heating the foot of the article, means for bringing the article and heating means into and out of operative relationship with one another, a movable shaping tool for applying controllable pressure to one surface of the rotating foot so as to cause the glass to move away from the axis of rotation of the foot, a second shaping tool adapted to be adjustably positioned at the side of the foot opposite from the first tool to resist said applied pressure and impart a predetermined surface of revolution to the foot, means to support and move the tools as a unit into and out of position to engage the foot, and means to move the first shaping tool into engagement with the foot and shape the foot against the second shaping tool, and means for automatically opening the article holding means to release the article.

21. In combination, in a machine for reshaping the partially formed foot of a glass article, an article holding means for rotating the article about its axis of revolution, means for heating the foot of the article, means for bringing the article and heating means into and out of operative relationship with one another, a movable shaping tool for applying controllable pressure to one surface of the rotating foot so as to cause the glass to move away from the axis of rotation of the foot, a second shaping tool adapted to be adjustably positioned at the side of the foot opposite from the first tool to resist said applied pressure and impart a predetermined surface of revolution to the foot, means to support and move the tools as a unit into and out of position to engage the foot, and means to move the first shaping tool into engagement with the foot and shape the foot against the second shaping tool, means for automatically opening the article holding means to release the article, and automatically operating means for imparting the desired movements to these several mechanisms in properly timed relationship to one another.

22. In combination, in a machine for reshaping the partially formed foot of a glass article, an article holding means, means for heating the foot of the article, means for rotating the holding means and the article supported thereby about the axis of revolution of the article to cause the glass of the heated foot to flow outwardly by centrifugal force, a pair of cooperating re-shaping tools, means for supporting the tools and moving them as a unit into and out of position to engage the opposed surfaces of the rotating foot, and means for moving one tool toward the other to give a predetermined surface of revolution to the foot.

HAROLD R. SCHUTZ.